(12) United States Patent
Liao

(10) Patent No.: US 8,592,074 B2
(45) Date of Patent: Nov. 26, 2013

(54) SEPARATOR AND METHOD OF MANUFACTURING THE SAME AND ORGANIC BATTERY EMPLOYING THE SAME

(75) Inventor: Chungpin Liao, Taichung (TW)

(73) Assignee: Innot Bioenergy Holding Co., George Town (KY)

(*) Notice: Subject to any disclaimer, the term of this patent is extended or adjusted under 35 U.S.C. 154(b) by 371 days.

(21) Appl. No.: 13/076,328

(22) Filed: Mar. 30, 2011

(65) Prior Publication Data
US 2012/0148900 A1 Jun. 14, 2012

(30) Foreign Application Priority Data
Dec. 13, 2010 (CN) .......................... 2010 1 0585575

(51) Int. Cl.
*H01M 2/16* (2006.01)
(52) U.S. Cl.
USPC ........................ 429/144; 429/249; 428/411.1
(58) Field of Classification Search
None
See application file for complete search history.

(56) References Cited

U.S. PATENT DOCUMENTS

| 6,511,774 B1 | 1/2003 | Tsukuda et al. |
| 6,905,798 B2 | 6/2005 | Tsukuda et al. |
| 7,405,172 B2 | 7/2008 | Shigematsu et al. |
| 2002/0137420 A1* | 9/2002 | Dacey et al. .................. 442/389 |
| 2009/0325067 A1 | 12/2009 | Liao et al. |

FOREIGN PATENT DOCUMENTS

TW I288495 B 10/2007

* cited by examiner

*Primary Examiner* — Milton I Cano
*Assistant Examiner* — Carmen Lyles-Irving
(74) *Attorney, Agent, or Firm* — Morris Manning & Martin LLP; Tim Tingkang Xia, Esq.

(57) ABSTRACT

An exemplary separator of the present invention includes a first layer and a second layer. The first layer has a principal body made from high fiber material. The second layer is made from chlorophyll, and is deposed on the first layer. In one embodiment, the separator comprises a third layer, where the second layer is sandwiched between the first layer and the third layer. An organic battery using the separator and a method of manufacturing the separator are also provided in the present invention.

13 Claims, 2 Drawing Sheets

SEPARATOR AND METHOD OF MANUFACTURING THE SAME AND ORGANIC BATTERY EMPLOYING THE SAME

CROSS-REFERENCE TO RELATED APPLICATION

This application claims priority of Chinese Patent Application No. 201010585575.6, filed on Dec. 13, 2010, entitled "separator and method of manufacturing the same and organic battery employing the same" by Chungpin Liao, the disclosure of which is incorporated herein by reference in its entirety.

FIELD OF THE INVENTION

The present invention relates to separators, and more particularly to a separator used in a battery, a method of manufacturing the separator, and an organic battery employing the separator.

BACKGROUND OF THE INVENTION

Batteries are popularly used in portable electronic devices such as mobile phones, person digital assistants, digital cameras, and so on. Typical batteries generally include mercury, zinc, manganese, or lithium, which may result in environmental pollutions and hence, are harmful to human health.

Moreover, a separator used in a typical battery is generally made from polyolefin. The separator includes a plurality of micro holes. However, these holes of the separator made from polyolefin are generally closed under a temperature of 90 degree Celsius to 165 degree Celsius. In that case, the battery may be exploded when a temperature in the battery reaches 90 degree Celsius to 165 degree Celsius.

Therefore, an unaddressed need for a separator used in battery exists in the art to address the aforementioned deficiencies and inadequacies.

SUMMARY OF THE INVENTION

The present invention provides a separator, a method of manufacturing the separator, and an organic battery using the separator that may improve a utilization ratio of a high fibre and a chlorophyll, and a reaction square of an organic battery using the separator. The advantages of the present invention will be understood more readily after a consideration of the drawings and the detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Reference will now be made to the drawings to describe an exemplary embodiment in detail.

Figure 1:
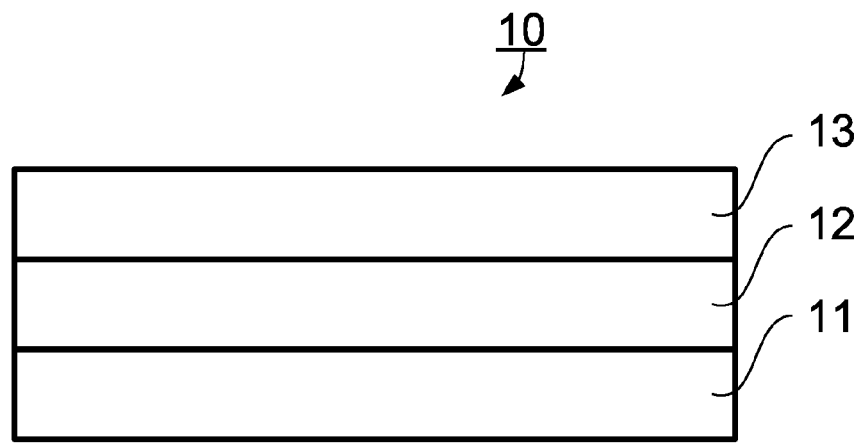
FIG. 1 shows is a sectional view of a separator according to one embodiment of the present invention.

Referring to FIG. 1, a separator 10 according to one embodiment of the present invention is shown. The separator 10 includes (1) a first layer 11, having a top surface and an opposite, bottom surface, (2) a second layer 12 having a top surface and an opposite, bottom surface, wherein the bottom surface of the second layer 12 is positioned on the top surface of the first layer 11, and (3) a third layer 13 having a top surface and an opposite, bottom surface, wherein the bottom surface of the third layer 13 is positioned on the top surface of the second layer 12. In the illustrated embodiment, a total thickness of the separator 10 is in a range of about 0.01 mm to about 0.1 mm, and a preferred thickness of the separator 10 is 0.05 mm.

The first layer 11 includes a principal body (not labeled) made from high fibre material. The principal body of the first layer 11 has a layered structure, and could be one or more kinds of paper. For example, the principal body of the first layer 11 is selected from the group consisting of glassine paper, one-side glaze paper, tissue paper, silk paper, rice paper, coffee filter paper, and so on. The principal body of the first layer 11 includes a plurality of micro holes, and the diameter of each micro hole is between 0.01 um to 0.1 mm. The first layer 11 further includes an organic salt solution or an inorganic salt solution absorbed by the principal body, and the electrical conductivity of the organic salt solution or the electrical conductivity of the inorganic salt solution is in a range of about 10 ms/cm to about 500 ms/cm. In the illustrated embodiment, lithium is excluded from the organic salt solution and the inorganic salt solution. For example, the inorganic salt of the inorganic salt solution is selected from the group consisting of sodium iodide, sodium chloride, and sodium hydroxide.

The second layer 12 is made from chlorophyll, and is deposed on the top surface of the principal body of the first layer 11. In one embodiment, the chlorophyll is selected from the group consisting of chlorophyll a, chlorophyll b, chlorophyll c1, chlorophyll c2, chlorophyll d, and chlorophyll e. The chlorophyll is either chlorophyll powder or chlorophyll dissolved in a solution. The diameter of the chlorophyll powder is in a range of about 0.01 um to about 1 mm. The solution having chlorophyll dissolved therein is saturated solution. The chlorophyll is obtained by extracting natural plant leaves having chlorophyllase removed therefrom.

The third layer 13 is deposed on the top surface of the second layer 12. That is, the second layer 12 is sandwiched between the first layer 11 and the third layer 13. The third layer 13 is the same as the first layer 11, and also includes a principal body made from high fibre.

Figure 2:
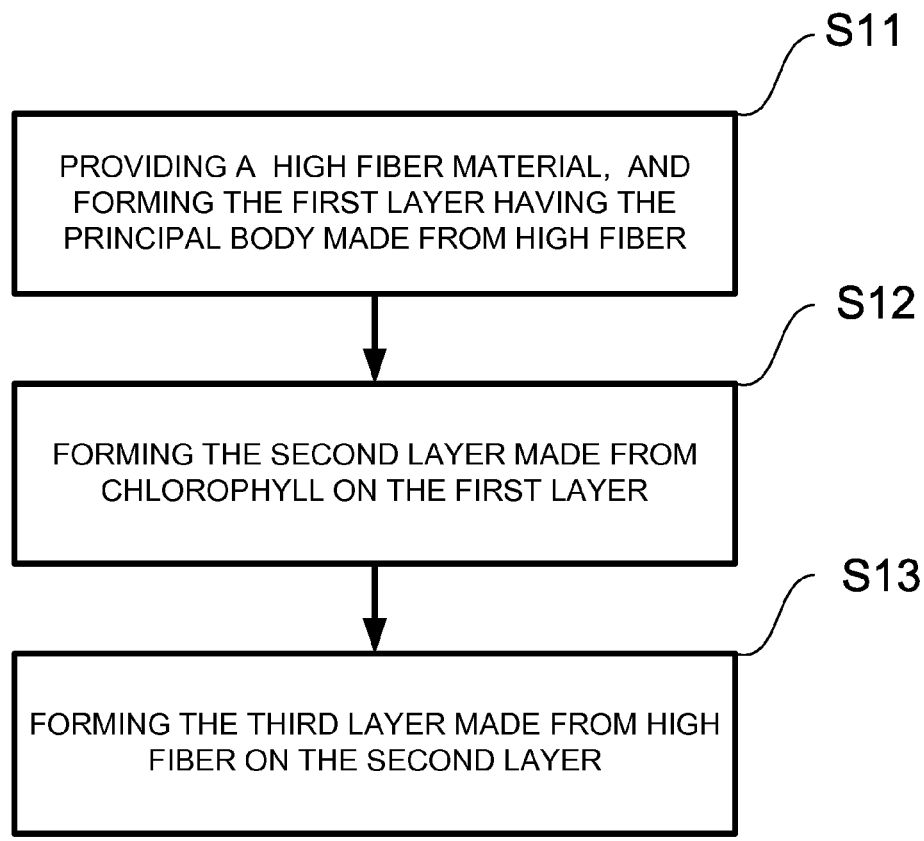
FIG. 2 is a flow chart of a method of manufacturing the separator as shown in FIG. 1.

Referring to FIG. 2, a method of manufacturing the separator 10 as shown in FIG. 1 is shown. The method includes the following steps:

step S11, providing high fibre material and forming the first layer 11 with the high fibre material; When the organic salt solution or the inorganic salt solution is absorbed by the principal body, the principal body and the organic salt solution or the inorganic salt solution are baked in an oven. A baking temperature can be in a range of 25 degree Celsius to 300 degree Celsius, for about 4 to 10 minutes. A preferred baking temperature is 100 degree Celsius, preferably for 6 minutes.

step S12, forming the second layer 12 made from chlorophyll on the top surface of the first layer 11; First, chlorophyll is formed on the top surface of the first layer 11 by a spreading method or a pressing method. Second, the first layer 11 with the chlorophyll is then baked to form the second layer 12.

step S13, forming the third layer 13 with high fibre material on the top surface of the second layer 12; The third layer 13 is formed in a similar way as the first layer 11 is formed. When the organic salt solution or the inorganic salt solution is absorbed by the principal body, the principal body with the organic salt solution or the inorganic salt solution is baked to form the third layer 13. The first layer 11, the second layer 12, and the third layer 13 together form the separator 10.

When chlorophyll takes a powder form, the chlorophyll powder is used to form the second layer 12 by a pressing method. When the chlorophyll takes a liquid form, the chlorophyll solution is used to form the second layer 12 by a spreading method, a dropping method, or a spraying method.

The separator 10 includes the first and third layers 13 made from high fibre and the second layer 12 made from chlorophyll, which improves a utilization ratio of the high fibre material and chlorophyll. Moreover, a contact square of the separator 10 is improved, and a reaction square of an organic battery employing the separator 10 is improved accordingly.

Figure 3:
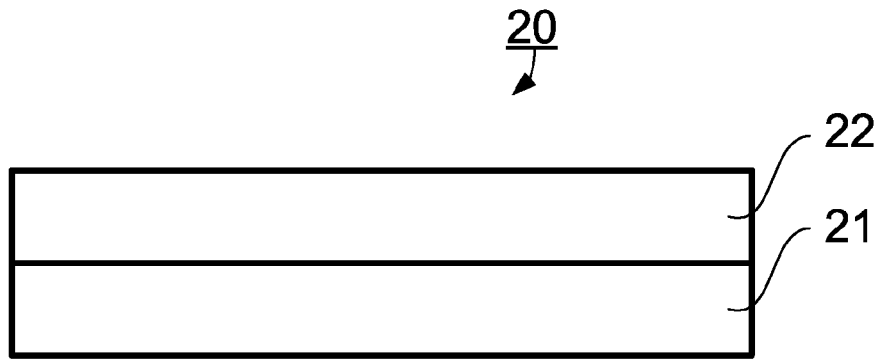
FIG. 3 is a sectional view of a separator according to another embodiment of the present invention.

Referring to FIG. 3, a separator 20 according to another embodiment of the present invention is shown. The separator 20 is generally similar to the separator 10 of the first embodiment. However, the separator 20 includes (1) a first layer 21, having a top surface and an opposite, bottom surface and (2) a second layer 22, having a top surface and an opposite, bottom surface, wherein, the bottom surface of the second layer 22 is deposed on the top surface of the first layer 21. The first layer 21 includes a principal body made from high fibre material, and contains organic salt solution or inorganic salt solution absorbed by the principal body. The second layer 22 is made from chlorophyll, and is provided on the top surface of the principal body of the first layer 21.

Figure 4:
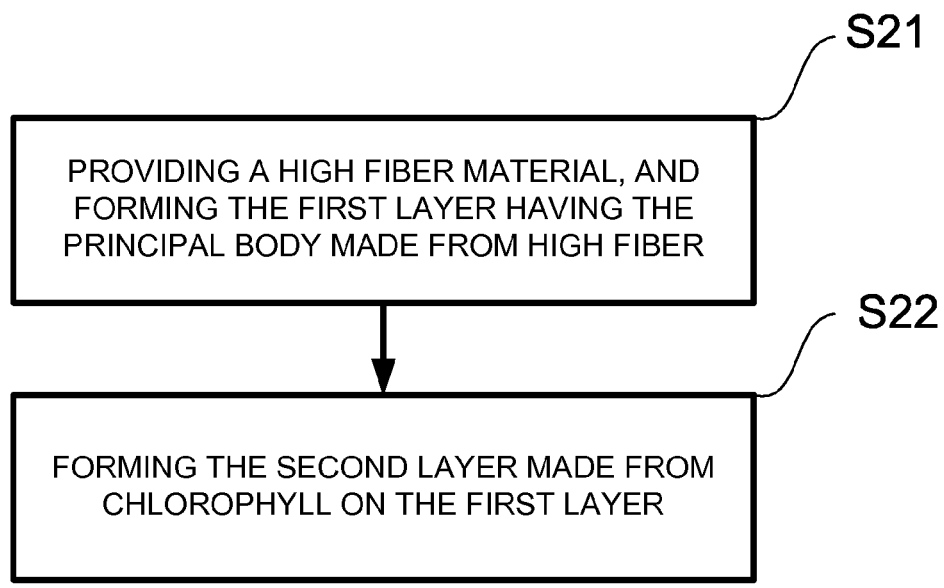
FIG. 4 is a flow chart of a method of manufacturing the separator as shown in FIG. 3.

Referring to FIG. 4, a method of manufacturing the separator 20 as shown in FIG. 3 is presented according to one embodiment of the present invention. The method includes the following steps:

step S21, providing a high fibre material and forming the first layer 21 with the principal body made from high fibre material; When the organic salt solution or the inorganic salt solution is absorbed by the principal body, the principal body with the organic salt solution or the inorganic salt solution are baked in an oven. A baking temperature is in a range of about 25 degree Celsius to 300 degree Celsius, for 4 to 10 minutes. A preferred baking temperature is about 100 degree Celsius, preferably for about 6 minutes.

step S22, forming the second layer 22 made from chlorophyll; First, the chlorophyll is formed on the top surface of the first layer 21 by a spreading method or a pressing method. Second, the first layer 21 containing chlorophyll is baked to form the second layer 22.

The separator 20 of this embodiment has advantages similar to those of the separator 10 described above.

An organic battery of the present invention employs the separator 10 or the separator 20, and it has an advantage of easy manufacture at a low cost. Furthermore, the organic battery employs recyclable materials to replace typical pollutants. Therefore the organic battery is more friendly for environmental protection.

In alternative embodiments, the separator may include two or more layers made from chlorophyll, or three or more layers made from high fibre material. That is, the separator may include at least one first layer having a principal body made from high fibre and at least one second layer made from chlorophyll.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A separator for a battery, having a principal body, comprising:
   a. a first layer, having a principal body, a bottom surface, and an opposite, top surface, with a principal body made from high fibre material; and
   b. a second layer made from chlorophyll, wherein the second layer has a principal body, a bottom surface, and an opposite, top surface, and the bottom surface of the second layer is deposed on the top surface of the first layer.

2. The separator of claim 1, wherein the chlorophyll is selected from the group consisting of chlorophyll a, chlorophyll b, chlorophyll c1, chlorophyll c2, chlorophyll d, and chlorophyll e.

3. The separator of claim 1, wherein the chlorophyll is chlorophyll powder.

4. The separator of claim 3, wherein the diameter of the chlorophyll powder is in a range of about 0.01 um to about 1 mm.

5. The separator of claim 1, wherein the first layer further comprises an organic salt solution or an inorganic salt solution absorbed by the principal body of the first layer.

6. The separator of claim 1, wherein the principal body comprises a plurality of micro holes, and the diameter of each of these micro holes is in a range of about 0.01 um to about 0.1 mm.

7. The separator of claim 1, wherein the total thickness of the separator is in a range of about 0.01 mm to about 0.1 mm.

8. The separator of claim 7, wherein the total thickness of the separator is preferrably 0.05 mm.

9. The separator of claim 1, further comprising a third layer having a principal body, a bottom surface, and an opposite top surface, wherein the bottom surface of the second layer is deposed on the top surface of the second layer.

10. The separator of claim 9, wherein the principal body of the third layer comprises high fibre material.

11. An organic battery having a separator, wherein the separator comprises:
    a. a first layer made from high fibre material, having a principal body, a bottom surface, and an opposite, top surface; and
    b. a second layer made from chlorophyll, wherein the second layer has a principal body, a bottom surface and an opposite, top surface, and the bottom surface of the second layer is deposed on the top surface of the first layer,
    wherein the total thickness of the separator is in a range of about 0.01 mm to about 0.1 mm.

12. The organic battery of claim 11, wherein the separator further comprises a third layer having a principal body, a bottom surface, and an opposite top surface, wherein the bottom surface of the second layer is deposed on the top surface of the second layer.

13. The organic battery of claim 12, wherein the principal body of the third layer comprises high fibre material.

\* \* \* \* \*